Oct. 12, 1965  E. K. MAURSEY  3,211,487

OPERATING HANDLE ASSEMBLY

Filed Sept. 18, 1963

INVENTOR.
Ethan K. Maursey
BY
W. S. Pettigrew
ATTORNEY

United States Patent Office 3,211,487
Patented Oct. 12, 1965

3,211,487
OPERATING HANDLE ASSEMBLY
Ethan K. Maursey, Warren, Mich., assignor to General Motors Corporation, Detroit, Mich., a corporation of Delaware
Filed Sept. 18, 1963, Ser. No. 309,613
7 Claims. (Cl. 292—353)

This invention relates to operating handle assemblies and more particularly to an operating handle assembly adapted to be drivingly associated with an operating member.

One feature of this invention is that it provides an operating handle assembly including a movable handle member adapted to be secured to an operating member in spaced relationship to a vehicle body or other wall through which the member projects, and an escutcheon member movable with the handle member and closing the space between the handle member and wall. Another feature of this invention is that the escutcheon member includes integral resilient retaining elements secured to the operating member and operable to bias the escutcheon member toward the wall to accommodate various spatial relationships of the handle member and wall. A further feature of this invention is that the retaining elements also releasably secure the handle member to the operating member. Still another feature of this invention is that means are provided for releasing the retaining elements from the operating member by restraining the escutcheon member against movement with the handle member so that the handle member may be removed from the operating member.

These and other features and advantages of the invention will be readily apparent from the following specification and drawings wherein.

Figure 1:
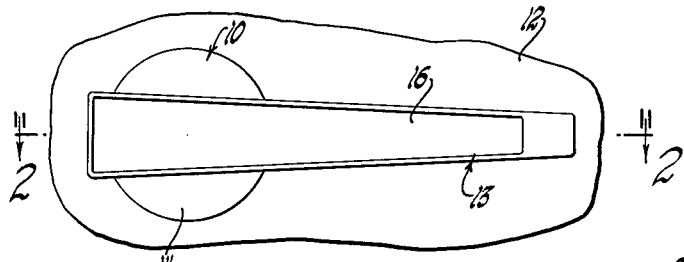
FIGURE 1 is an elevational view of an operating handle assembly according to this invention shown installed on a vehicle or other body wall.
Figure 2:
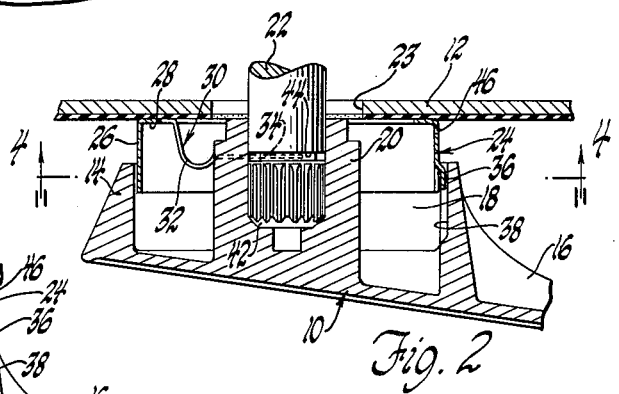
FIGURE 2 is an enlarged sectional view taken generally along the plane indicated by the line 2—2 of FIGURE 1 showing the handle assembly in one installed position with respect to the body wall.
Figure 3:
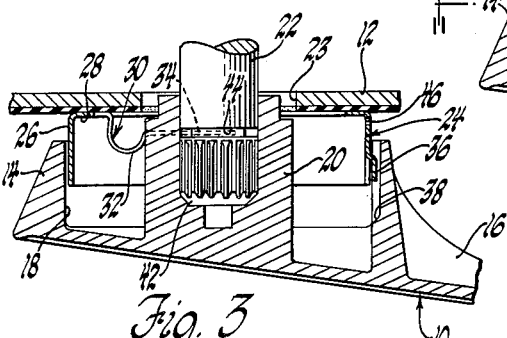
FIGURE 3 is a view similar to FIGURE 2 showing the handle assembly in another installed position with respect to the body wall.

Referring now to FIGURE 1 of the drawings, an operating handle assembly 10 is shown in installed position on a vehicle or other body wall 12. Assembly 10 includes a handle member 13 having a hub portion 14 and a gripping portion 16. As shown in FIGURES 2 and 3, hub portion 14 and a gripping portion 16. As shown in FIGURES 2 and 3, hub portion 14 includes an annular recess 18 and a central generally elliptical mounting boss 20 bored and internally splined to receive the complementary splined end of a spindle or operating member 22 projecting through an aperture 23 of wall 12 from a door lock or other mechanism, not shown.

An escutcheon and retaining member 24 is adapted to be slidably received in recess 18 so as to telescope relative to hub 14 and conceal spindle 22 and boss 20 from view when the handle member is installed on the spindle. As seen best in FIGURE 6, the escutcheon member includes an annular decoratively finished wall 26, a radially inturned lip 28, and a pair of integral radially inwardly extending retaining elements or fingers 30. Each finger 30 includes a sinuous generally axially inwardly extending resilient arm 32 and a radially extending retaining head 34.

The escutcheon member is mounted in handle 10 by aligning an offset tab 36 in wall 26 with an axially extending partial groove 38 in the wall of hub 14, and then inserting the escutcheon member in recess 18 while prying the fingers 30 radially apart so that the fingers will move over boss 20 and snap within opposite notches 40 in boss 20 which open to the spindle bore of the boss.

The handle member and escutcheon member assembly is installed on spindle 22 by inserting the spindle within the spindle bore until the retaining heads 34 encounter the tapered end 42 of the spindle, whereupon fingers 30 are again forced radially apart and ride over the spindle until the heads 34 register with and snap into an annular retaining groove 44 in the spindle. Heads 34 thus secure or interlock the handle member to the spindle against movement axially thereof.

As indicated in FIGURES 2 and 3, normal assembly variations in the extent to which spindle 22 projects out of wall 12 will result in corresponding variations in the distance over which handle 10 is spaced from the wall 12 when it is installed on the spindle. A maximum desirable spaced relation between handle 10 and wall 12 is shown in FIGURE 2, wherein the escutcheon member is located in generally fully extended position relative to the handle member by the fingers 30. FIGURE 3 shows the handle member in a position closer to wall 12 wherein the escutcheon member is telescoped substantially within recess 18 against the action of fingers 30 which are substantially deformed in this position of the handle member. It will be apparent that the fingers 30 urge the escutcheon member against wall 12 in these or any intermediate positions of the handle member relative to the wall.

Figure 4:
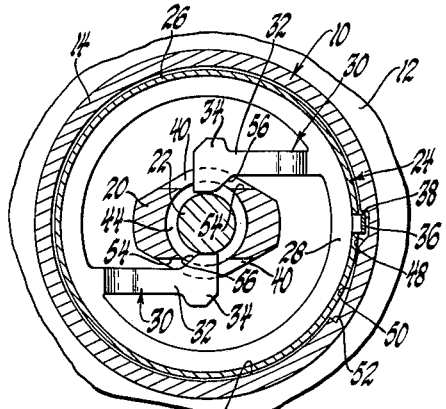
FIGURE 4 is a sectional view taken generally along the plane indicated by the line 4—4 of FIGURE 2 showing the retaining elements in retaining positions.
Figure 5:
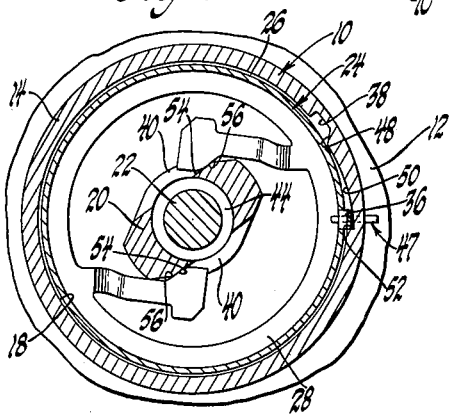
FIGURE 5 is a view similar to FIGURE 4 showing the retaining elements in disengaged position.
Figure 6:
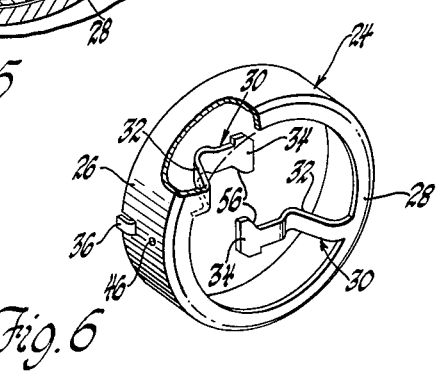
FIGURE 6 is a perspective view of the escutcheon member.

Referring now to FIGURES 4, 5 and 6, means are provided for conveniently removing the handle member and escutcheon member as a unit from spindle 22. A small aperture 46 is provided in wall 26 of escutcheon member 24 for the insertion of a suitable pointed tool 47 as indicated in FIGURE 5. When inserted, the tool is operative to restrain the escutcheon member against rotation with the handle member. The handle member is then rotated relative to the escutcheon member in a counterclockwise direction, as viewed in FIGURES 1 and 5, to cam tab 36 out of groove 38 over an inclined wall 48 and a surface 50 of the hub until it engages a radial wall 52 thereof. During such rotation of the handle member, opposite radially outwardly facing walls 54 of slots 40 engage cam edges 56 of the retaining heads 34 and force fingers 30 radially apart to remove the heads from groove 44 in the spindle, FIGURE 5. The handle member and escutcheon member may then be removed as a unit from the spindle. The engagement of tab 36 with wall 52 prevents unneeded relative rotation between the handle member and the escutcheon member so that the fingers 30 are not unnecessarily deformed or destroyed.

Thus a new and improved operating handle assembly is provided.

I claim:
1. An operating handle assembly for driving association with an operating member projecting through a body wall, comprising, a handle member adapted to be secured to said operating member and spaced from said wall, an escutcheon member extending from said handle member toward said wall, and means biasing said escutcheon member toward said wall, said biasing means securing said handle member to said operating member against movement relative thereto.

2. An operating handle assembly for driving association with an operating member projecting through a body wall, comprising, a handle member adapted to be secured to said operating member and spaced from said wall, an escutcheon member movable relative to said handle member to a position extending therefrom toward said wall, and resilient means integral with said escutcheon member and secured to said handle member and said operating member to bias said escutcheon member to said position thereof, said resilient means securing said handle member to said operating member against movement relative thereto.

3. An operating handle assembly for driving association with a mechanism spindle projecting through a body wall, comprising, a handle member adapted to be secured to said spindle and spaced from said wall, an escutcheon member slidably received in said handle member for movement relative thereto and axially of said spindle to a position extending from said handle member toward said wall, said escutcheon member including an integral elongated resilient element having an end portion thereof secured to said handle and said spindle to bias said escutcheon member relative thereto to said position thereof, said secured end portion securing said handle member on said spindle against movement axially thereof.

4. An operating handle assembly for driving association with an operating member comprising, a handle member adapted to be secured to said operating member, a retaining member, means yieldably securing said retaining member to said handle member for movement therewith, said retaining member including locking means adapted for engagement with cooperable locking means on said operating member to normally positively secure said handle member to said operating member, and means operable upon forced movement of said handle member independently of said retaining member to disengage said locking means from the cooperable locking means on said operating member.

5. An operating handle assembly for driving association with an operating member, comprising, a handle member adapted to be nonrotatably secured to said operating member, a retaining member, means yieldably securing said retaining member to said handle member for rotation therewith, said retaining member including locking means adapted for engagement with cooperable locking means on said operating member to normally positively secure said handle member on said operating member against axial movement relative thereto, and means on said handle member and said retaining member engageable upon forced rotation of said handle member independently of rotation of said retaining member to cam said locking means out of engagement with the cooperable locking means on said operating member to permit movement of said handle member axially thereof.

6. An operating handle assembly for driving association with a mechanism spindle projecting through a body wall, comprising, a handle member nonrotatably received on said spindle and spaced from said wall, a retaining member located intermediate said handle member and said wall, means yieldably securing said retaining member to said handle for rotation therewith, said retaining member including integral resilient locking elements adapted for resilient locking engagement with cooperable locking means on said spindle to lock said handle on said spindle against movement axially thereof, and means on said handle member and said retaining member engageable upon forced rotation of said handle independently of rotation of said retaining member to cam said locking elements out of locking engagement with the cooperable locking means on said spindle to permit movement of said handle member axially thereof.

7. An operating handle assembly for driving association with a mechanism spindle projecting through a body wall, comprising, a handle member nonrotatably received on said spindle and spaced from said wall, an escutcheon member slidably received in said handle member for movement relative thereto and axially of said spindle to a position extending from said handle member toward said wall, means yieldably securing said escutcheon member to said handle member for rotation therewith, said escutcheon member including a pair of integral resilient elongated retaining elements having end portions anchored to said handle member and said spindle to bias said escutcheon member relative thereto to said position thereof, said retaining element end portions normally interlocking said handle member and said spindle to retain said handle member on said spindle against movement axially thereof, and means on said handle and said retaining elements engageable upon forced rotation of said handle member independently of rotation of said escutcheon member to cam said retaining elements out of interlocking relation with said spindle to permit movement of said handle member axially thereof.

References Cited by the Examiner

UNITED STATES PATENTS

| 1,787,707 | 1/31 | Sullivan | 292—357 X |
| 2,189,845 | 2/40 | Terrill. | |
| 2,924,480 | 2/60 | Holland | 292—357 X |

FOREIGN PATENTS 440,127  12/35  Great Britain.

M. HENSON WOOD, JR., *Primary Examiner.*